United States Patent
Kuo et al.

(10) Patent No.: US 9,094,178 B2
(45) Date of Patent: Jul. 28, 2015

(54) CORRECTING APPARATUS FOR TIMING RECOVERY OF RECEIVER AND METHOD THEREOF

(71) Applicant: MStar Semiconductor, Inc., Hsinchu Hsien (TW)

(72) Inventors: Chih-Cheng Kuo, Hsinchu County (TW); Ching-Fu Lan, Hsinchu County (TW); Tai-Lai Tung, Hsinchu County (TW)

(73) Assignee: MSTAR SEMICONDUCTOR, INC., Hsinchu Hsien (TW)

( * ) Notice: Subject to any disclaimer, the term of this patent is extended or adjusted under 35 U.S.C. 154(b) by 0 days.

(21) Appl. No.: 14/299,507

(22) Filed: Jun. 9, 2014

(65) Prior Publication Data

US 2014/0362963 A1    Dec. 11, 2014

(30) Foreign Application Priority Data

Jun. 11, 2013    (TW) .............................. 102120762 A (51) Int. Cl.
*H04L 7/00* (2006.01)
*H04L 7/027* (2006.01)
*H04L 27/26* (2006.01)

(52) U.S. Cl.
CPC ............ *H04L 7/0079* (2013.01); *H04L 7/0016* (2013.01); *H04L 7/0054* (2013.01); *H04L 7/0062* (2013.01); *H04L 7/027* (2013.01); *H04L 27/2663* (2013.01); *H04L 27/2671* (2013.01); *H04L 27/2675* (2013.01); *H04L 27/2695* (2013.01)

(58) Field of Classification Search
CPC ............................ H04L 7/0016; H04L 7/0054
See application file for complete search history.

(56) References Cited

U.S. PATENT DOCUMENTS

| | | | |
|---|---|---|---|
| 7,545,870 B1 | 6/2009 | Shirakata et al. | |
| 8,031,587 B1* | 10/2011 | Kang | 370/210 |
| 2002/0105599 A1 | 8/2002 | Hong et al. | |
| 2005/0152441 A1* | 7/2005 | Wu | 375/222 |
| 2006/0245349 A1* | 11/2006 | Vrcelj et al. | 370/210 |
| 2006/0285616 A1* | 12/2006 | Yen et al. | 375/355 |
| 2007/0047433 A1* | 3/2007 | Kao | 370/208 |
| 2007/0280337 A1* | 12/2007 | Hays | 375/150 |
| 2010/0166088 A1* | 7/2010 | Arambepola et al. | 375/260 |
| 2011/0116562 A1* | 5/2011 | Li et al. | 375/260 |
| 2011/0280349 A1* | 11/2011 | Hong et al. | 375/344 |
| 2012/0263167 A1 | 10/2012 | Wang | |

* cited by examiner

*Primary Examiner* — Jean B Corrielus
(74) *Attorney, Agent, or Firm* — WPAT, PC; Justin King (57) ABSTRACT

A correcting apparatus for timing recovery of a receiver is provided. The receiver includes a timing recovery module that outputs a first symbol and a second symbol. The correcting apparatus includes: a channel impulse response module, configured to generate a first set of peak times and a second set of peak times according to the first symbol and the second symbol, respectively; and a calculation module, configured to calculate a correction signal according to a relationship between the first and second sets of peak times and to send the correction signal to the timing recovery module.

7 Claims, 7 Drawing Sheets

CORRECTING APPARATUS FOR TIMING RECOVERY OF RECEIVER AND METHOD THEREOF

This application claims the benefit of Taiwan application Serial No. 102120762, filed Jun. 11, 2013, the subject matter of which is incorporated herein by reference.

BACKGROUND OF THE INVENTION

1. Field of the Invention

The invention relates in general to timing recovery of a receiver, and more particularly to a feedback convergence mechanism for timing recovery.

2. Description of the Related Art

In modern communication technologies, both a transmitting end and a receiving end employ a communication protocol or standard understood by both parties to promote the communications between the two parties. A signal transmitted by the transmitting end passes through a transmission channel and is received by the receiving end. In many communication protocol standards, a message to be transmitted is transmitted in form of chucks. In different communication protocols, these chucks may be referred to as packets, symbols, or other terms. In the disclosure, for better illustrations, these data chucks are referred to as symbols.

A communication protocol specifies a transmission speed or timing of these symbols. In other words, the transmitting end knows the speed according to which the symbols are to be transmitted, and the receiving end is also aware of receiving the symbols at the same speed. However, due to various realistic factors, the receiving end may not be able to synchronize the reception timing to be consistent with the transmitting end.

For example, a communication protocol standard may specify that transmission is to be performed at a speed of 1000 symbols per second. However, a clock oscillator at the transmitting end may not generate a timing of exactly 1 KHz. In practice, a timing error inevitably exists in the clock oscillator. In one ambient temperature, the clock oscillator at the transmitting end may exactly generate a perfect timing specified by the communication protocol. Yet, due to heat energy generated by constant operations of the transmitting end or a change in the ambient temperature, a change in the timing generated by the clock oscillator is unavoidably caused.

Similarly, the receiving end also requires a clock oscillator to generate the timing specified by the communication protocol. Same as the issue that the transmitting end encounters, the clock oscillator at the receiving end may not perfectly generate the timing specified by the communication protocol. In other words, although the timing specified by the communication protocol is 1 KHz, assuming that the transmitting end transmits the symbols at a timing of 1.001 KHz, the receiving end is also required to receive the symbols at a timing of 1.001 KHz. Assuming that the transmitting end transmits the symbols at a timing of 0.999 KHz, the receiving end is also required to receive the symbols at a timing of 0.999 KHz. Assuming that the receiving end is limited to operate at a timing of 1 KHz, complications may arise in the reception operations of the symbols.

Figure 1:
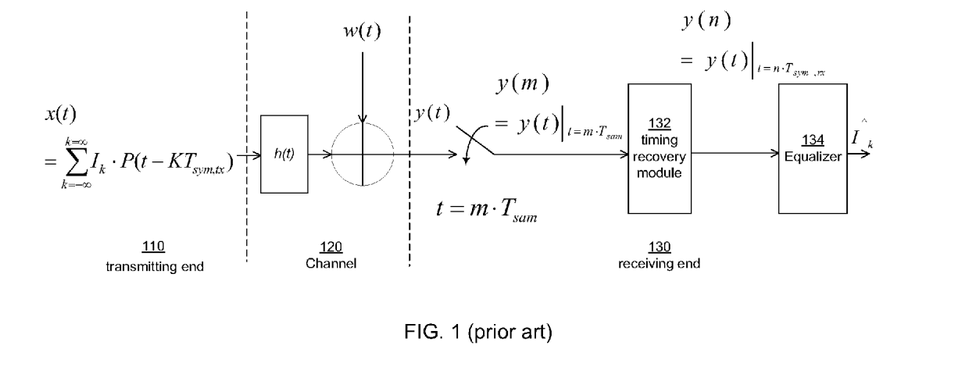
FIG. 1 is a schematic diagram of a signal propagation model in the prior art.

FIG. 1 shows a schematic diagram of a signal propagation model in the prior art. Signals are transmitted by a transmitting end 110. These signals include multiple symbols, each of which being represented by $I_k$, where the subscript k represents a serial number. A pulse shaping function $P(x)$ outputs the symbols in form of pulses, and a transmission time length required by each symbol is $T_{sym,\,tx}$. A signal sequence transmitted by the transmitting end 110 is denoted as x(t).

The signal x(t) is transmitted via a channel 120 to a receiving end 130. In real situations, the channel 120 is imperfect as it receives distortion of a multipath effect h(t) and random interferences. The latter is usually referred to as an additive Gaussian white noise (AWGN), which is denoted as w(t).

Having passed through the distorted and interfered channel 120, a signal received by the receiving end 130 is denoted as y(t). The signal y(t) is sampled by a sampling rate 1/Tsam to obtain a sampled signal y(n). The sampled signal y(n) is forwarded by the receiver 130 to a timing recovery module 132. An effect of the timing recovery module 132 is to synchronize the timing to the frequency for transmitting the symbols by the transmitting end 110, such that $y(n) = y(t)|_{t=n \cdot T_{sym,rx}}$. The signal y(n) having passed through the timing recovery module 132 is forwarded to a subsequent processing unit, e.g., an equalizer 134, to decode and obtain a symbol $\hat{I}_k$. In an ideal situation, the symbol $\hat{I}_k$ is equal to the symbol $I_k$ transmitted from the transmitting end 110.

In general, the above sampling rate is usually faster than the frequency at which the symbols are transmitted. With the timing recovery module 132, the frequency is down-converted to the so-called baseband. Therefore, a process for processing the signal y(n) having passed through the timing recovery module 132 by a subsequent processing unit is referred to as baseband processing.

The above details describe an ideal signal propagation model. As previously stated, the clocks generated by the clock oscillators of the transmitting end 110 and the receiving end 130 are not necessarily the same. An event of same clocks generated by the clock oscillators of the transmitting end 110 and the receiving end 130 may be purely regarded as a coincidence. In other words, in the signals sent from the clock recovery module 132, the time $T_{sym,\,rx}$ occupied by each symbol received by the receiving end does not perfectly equal to the time $T_{sym,\,tx}$ occupied by each symbol transmitted from the transmitting end. After a period of time, start time boundaries of the symbols may fail to align and synchronize, such that the synchronization of the symbols may become discrete and thus bring problems in the communication.

Therefore, to synchronize the timings of the transmitter end 110 and the receiving end 130, there is a need for a feedback mechanism for the timing recovery module 132 to allow the receiving end 130 to more precisely synchronize with the timing of the transmitting end 110, i.e., to have $T_{sym,\,rx}$ to approximate $T_{sym,\,tx}$.

SUMMARY OF THE INVENTION

According to an embodiment of the present invention, a correcting apparatus for timing recovery of a receiver is provided. The receiver includes a timing recovery module that outputs a first symbol and a second symbol. The correcting apparatus includes: a channel pulse response module, configured to generate a first set of peak times and a second set of peak times according to the first symbol and the second symbol, respectively; and a calculation module, configured to calculate a correction signal according to a relationship between the first and second sets of peak times and to send the correction signal to the timing recovery module.

According to another embodiment of the present invention, a correcting method for timing recovery of a receiver is provided. The receiver includes a timing recovery module that outputs a first symbol and a second symbol. The correcting method includes: calculating channel pulse responses of the first symbol and the second symbol to obtain a first set of peak times and a second set of peak times, respectively; and calculating a correction signal according to a relationship between the first and second sets of peak times, and sending the correction signal to the timing recovery module.

The above and other aspects of the invention will become better understood with regard to the following detailed description of the preferred but non-limiting embodiments. The following description is made with reference to the accompanying drawings.

DETAILED DESCRIPTION OF THE INVENTION

Embodiments of the present invention are described in detail below. Apart from the disclosed embodiments, the present invention is also applicable to other embodiments. The scope of the present invention is not limited by the embodiments, and is defined in accordance with the appended claims. To better describe the contents of the present invention to one person skilled in the art and to keep the drawings clear, certain sizes and other associated scales may be emphasized to appear exaggerated, with unrelated details not entirely depicted.

A feature of the present invention is to provide a feedback mechanism for timing recovery that is capable of correcting a timing error within a short period. The feedback mechanism achieves a precision of correcting every symbol and thus lowers probabilities of reception errors and repeated transmission of the symbols.

Figure 2:
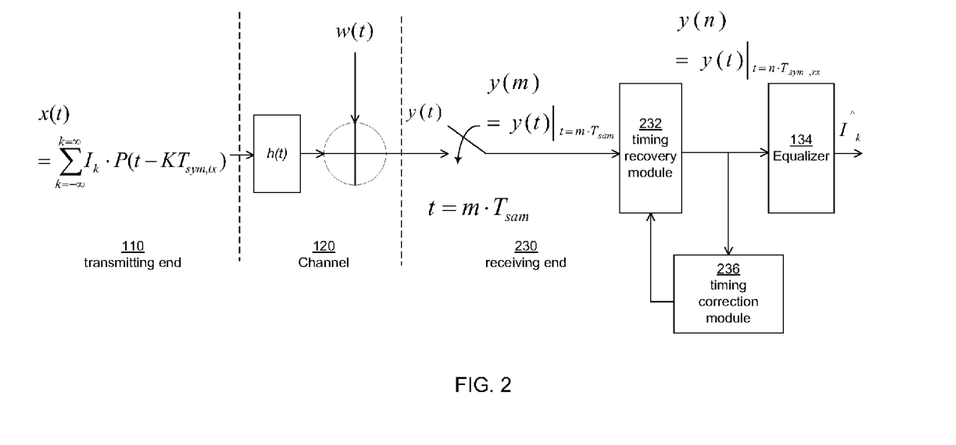
FIG. 2 is a block diagram of a receiving end according to an embodiment of the present invention.

FIG. 2 shows a block diagram of a receiving end 230 according an embodiment of the present invention. A difference of the embodiment from the receiving end 130 of the prior art is a timing recovery module 232 and a timing recovery correcting module 236 for feeding back a timing recovery condition. Other symbols correspond to the signal propagation module in FIG. 1, and associated details shall be omitted herein.

In general, a communication protocol specifies signals or symbols known to both the transmitting end 110 and the receiving end 230, so as to assist the receiving end 230 in signal acquisition and signal synchronization. A kind of the above signals or symbols is pilot signal. Further, pilot signals may also be utilized for channel estimation.

As both of the transmitting end 110 and the receiving end 230 know a format and arising positions of the pilot signals, the pilot signals are frequently applied for synchronization. In specifications of certain communication protocols, pilot signals may continuous pilots or scattered pilots. For example, in the Integrated Services Digital Broadcasting for Terrestrial Television (ISDB-T) communication protocol, pilot signals may be continuous pilots or scattered pilots consisted in form of symbols.

Figure 3:
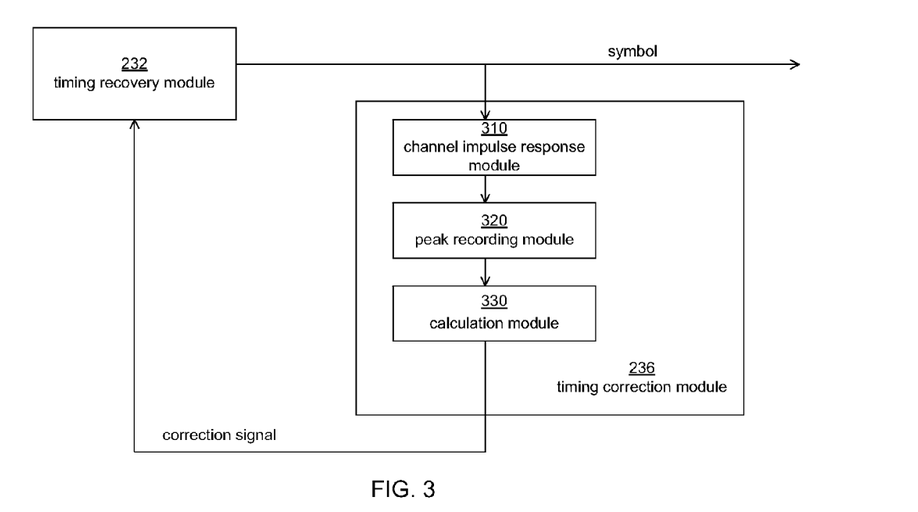
FIG. 3 is a detailed schematic diagram of a receiver end according to an embodiment of the present invention.

In the present invention, the above pilot signals, or any symbols known to the transmitting end 110 and the receiving end 230, may be utilized for correction and feedback of timing recovery. FIG. 3 shows a detailed schematic diagram of a receiving end according to an embodiment of the present invention. In FIG. 3, the timing recovery module 232 outputs multiple symbols that are timing corrected. In addition to being forwarded to a subsequent processing module, e.g., the equalizer 134, these symbols are also sent to the timing recovery correcting module 236.

The timing recovery correcting module 236 includes three secondary modules. A channel impulse response (CIR) module 310 first receives the symbols. The channel impulse response module 310 calculates a channel impulse response for each symbol. One person skilled in the art can understand the calculation for the channel impulse response, and such details shall be omitted herein.

If the timing recovery module 232 of the receiving end 230 correctly synchronizes with the symbol transmission rate of the transmitting end 110, the channel impulse response of each symbol reaches a high peak within a same period. For example, assuming that the symbol transmission rates of the transmitting end 110 and the timing recovery module 232 are synchronized at 1 KHz, at a time point of 1/1000 second after the channel impulse response of a previous symbol reaches a high peak, i.e., in exactly one period, the channel impulse response of a next symbol also reaches a high peak.

However, when the symbol rate of the timing recovery module 232 is faster than the symbol rate of the transmitting end 110, in other words, when the symbol period of the timing recovery module 232 is shorter than the symbol period of the transmitting end 110, the high peak of the channel impulse response of the next symbol is delayed.

Conversely, when the symbol period of the timing recovery module 232 is longer than the symbol period of the transmitting end 110, that is, when the symbol rate of the timing recovery module 232 is slower than the symbol rate of the transmitting end 110, the high peak of the channel impulse response of the next symbol is brought forward.

The above delayed and brought-forward times are associated with the symbol periods of the timing recovery module 232 and the transmitting end 110. Thus, by recording the times of the high peaks of the channel impulse response of two or more symbols, it can be learned whether the symbol period of the timing recovery module 232 is fast or slow. Further, the difference between a fast or slow symbol period and a correct symbol period can be calculated to further send a correction signal to the timing recovery module 232, so as to allow the timing of the timing recovery module 232 to converge to be substantially synchronized with the timing of the transmitting end 110.

Hence, referring to the embodiment in FIG. 3, the timing recovery module 236 may further include a peak recording module 320 and a calculation module 330. The peak recording module 320 records peak times and/or response levels of the channel impulse responses of multiple symbols. In one embodiment, multiple symbols refer to a previous symbol and a next symbol. In another embodiment, multiple symbols refer to a first symbol and an $N^{th}$ symbol subsequent to the first symbol.

In the previous embodiment, the channel impulse response module 310 calculates the channel impulse response for each symbol. An advantage of such approach is that timing correction and adjustment can be performed after receiving each symbol, and so the timing of each symbol may closely synchronize with the transmitting end 110. However, the calculation amount of such approach is much more than that of the second embodiment. In a next embodiment, the channel impulse response module 310 calculates the channel impulse response for every N symbols, and involves a calculation amount of 1/N of the previous embodiment. However, such approach suffers from a drawback that timing correction and adjustment can only be performed for every N symbols. For N in a large value, an asynchronous situation may arise in the N symbols. One person skilled in the art can understand that, according to different designs, different embodiments may be selected to design the timing recovery correcting module 236.

In one embodiment, the peak recording module 320 may be utilized to store all data generate by the channel impulse response module 310, at least including the peak time, response level and values of energy. In another embodiment, the peak recording module 320 may store a part of data. In another embodiment, the peak recording module 320 may store all data calculated by the calculating module 330, at least including the correction signal.

After the peak recording module 320 records multiple peak times of the channel impulse responses, the calculation module 330 may calculate a correction signal according to shift amounts and shift directions of the peaks and an interval between multiple symbols. The correction signal is fed back to the timing recovery module 232. According to the correction signal, the timing recovery module 232 corrects the frequency according to which its timing is generated to further synchronize with the symbol rate of the transmitting end 110.

Figure 4:
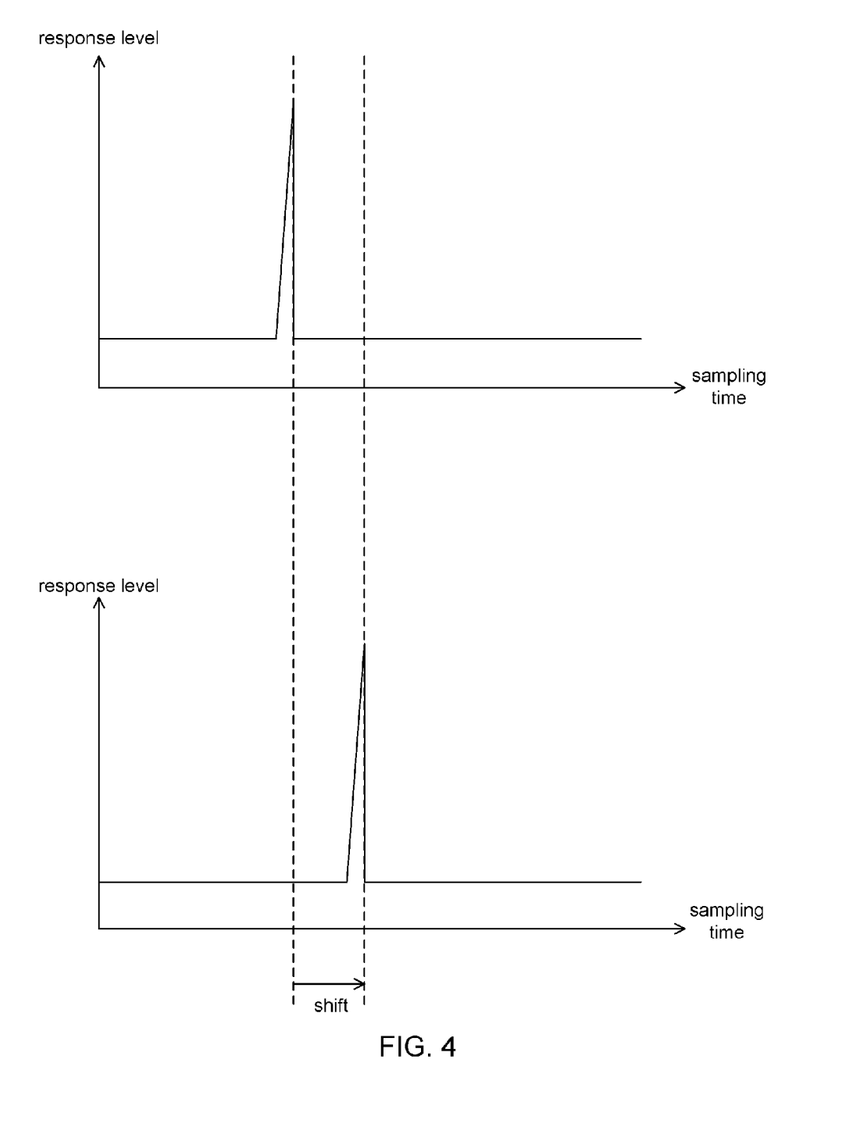
FIG. 4 is a schematic diagram of a timing shift in a peak of a channel pulse response according to an embodiment of the present invention.

FIG. 4 shows a schematic diagram of a timing shift in a peak of a channel impulse response according to an embodiment of the present invention. Two diagrams are depicted in FIG. 4. The upper diagram represents a timing diagram of a peak of a channel impulse response of a first symbol. The lower diagram represents a timing diagram of a peak of a channel impulse response of a second symbol. As previously stated, in one embodiment, the second symbol is a symbol that closely follows the first symbol. In another embodiment, the second symbol is an $N^{th}$ symbol subsequent to the first symbol.

The vertical axis in each diagram represents a response level of the channel impulse response, and the horizontal axis represents a sampling time. One person ordinary skill in the art can understand that, although the timing shift is represented in form of diagrams, the peak recording module 320 may illustrate the diagrams in FIG. 4 in any data form in actual designs. For example, the diagrams in FIG. 4 may be illustrated by form of a table or a two-dimensional array.

In the upper diagram of FIG. 4, it is indicated that the first symbol corresponds to one response peak. In the lower diagram, it is indicated that the second symbol also corresponds to one response peak. However, the response peak in the lower diagram has a shift compared to the response peak in the upper diagram, meaning that the timing of the timing recovery module 232 and the timing of the transmitting end 110 are asynchronous.

One person skilled in the art can understand that, although the shift depicted in FIG. 4 is to the right, the shift may also be to the left or no shift is present at all in actual possible situations. When there is no shift at all, it means that the timing of the timing recovery module 232 and the timing of the transmitting end 110 are synchronous. In the above situation, the calculation module 330 need not generate the correction signal, or is only required to generate a correction signal with a correction value of zero to be fed back to the timing recovery module 232. When the shift is not zero, as previously stated, the calculation module 330 may calculate a correction signal according to the shift amount and the shift direction of the peak and the interval between multiple symbols. The correction value represented by the correction signal is directly proportional to the shift amount of the peak.

Figure 5:
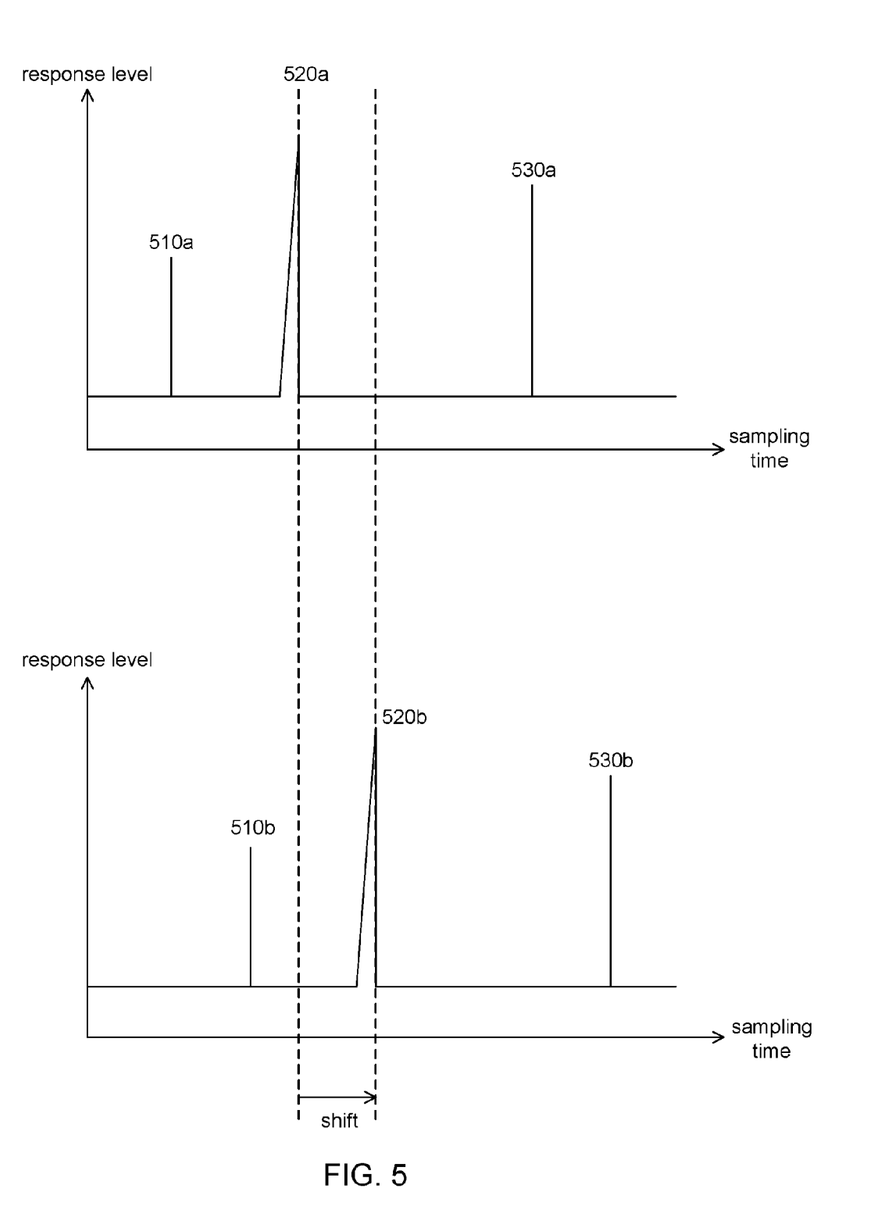
FIG. 5 is a schematic diagram of a timing shift in a peak of a channel pulse response according to another embodiment of the present invention.

FIG. 5 shows a schematic diagram of a timing shift in a peak of a channel impulse response according to another embodiment of the present invention. A difference between FIG. 4 and FIG. 5 is that, the first symbol and the second symbol in FIG. 4 respectively correspond to one response peak, and the first symbol and the second symbol in FIG. 5 respectively correspond to multiple response peaks. As previously described in the prior art, the reason causing the first symbol and the second symbol to respectively correspond to multiple response peaks is that the channel 120 may be affected by the multipath effect h(t).

The multipath effect h(t) means that a signal transmitted from the transmitting end 110 arrives the receiving end 230 via multiple paths 120. Due to different lengths of these paths, the time points at which the symbol signal arrive the receiving end 230 are different. Thus, for the same symbol, multiple response peaks exceeding a threshold are generated after calculations performed by the channel impulse response module 310. With the presence of multiple response peaks, the calculation module 330 requires extra efforts for calculations.

In an embodiment shown in FIG. 5, a first symbol in the upper diagram and a second symbol in the lower diagram both pass through three paths, and respectively yield three peaks after calculations of the channel impulse response module 310. The three peaks of the first symbol are denoted as 510a, 520a and 530a. The three peaks of the second symbol are denoted as 510b, 520b and 530b. For illustration purposes, the peaks corresponding to the first symbol are referred to a first set of peaks, which occur at a first set of peak times. Similarly, the peaks corresponding to the second symbol are referred to as a second set of peaks, which occur at a second set of peak times.

According to relative positions of the peaks, the peak 510a corresponds to the peak 510b, the peak 520a corresponds to the peak 520b, and the peak 530a corresponds to the peak 530b. Between the upper diagram and the lower diagram, the distances between the corresponding peaks are unchanged, and hence the above relationship is obtained. Further, the second peaks 520a and 520b are the highest of all three peaks, and the amount energy of signals transmitted along this path is the largest. Thus, this path may be regarded as a primary path, and the second peaks 520a and 520b may be regarded as primary peaks. In the embodiment in FIG. 5, when the primary peak 520a of the first symbol corresponds to the primary peak 520b of the second symbol, the shift amount of the primary peak may be utilized as a basis for calculating the correction signal.

Figure 6:
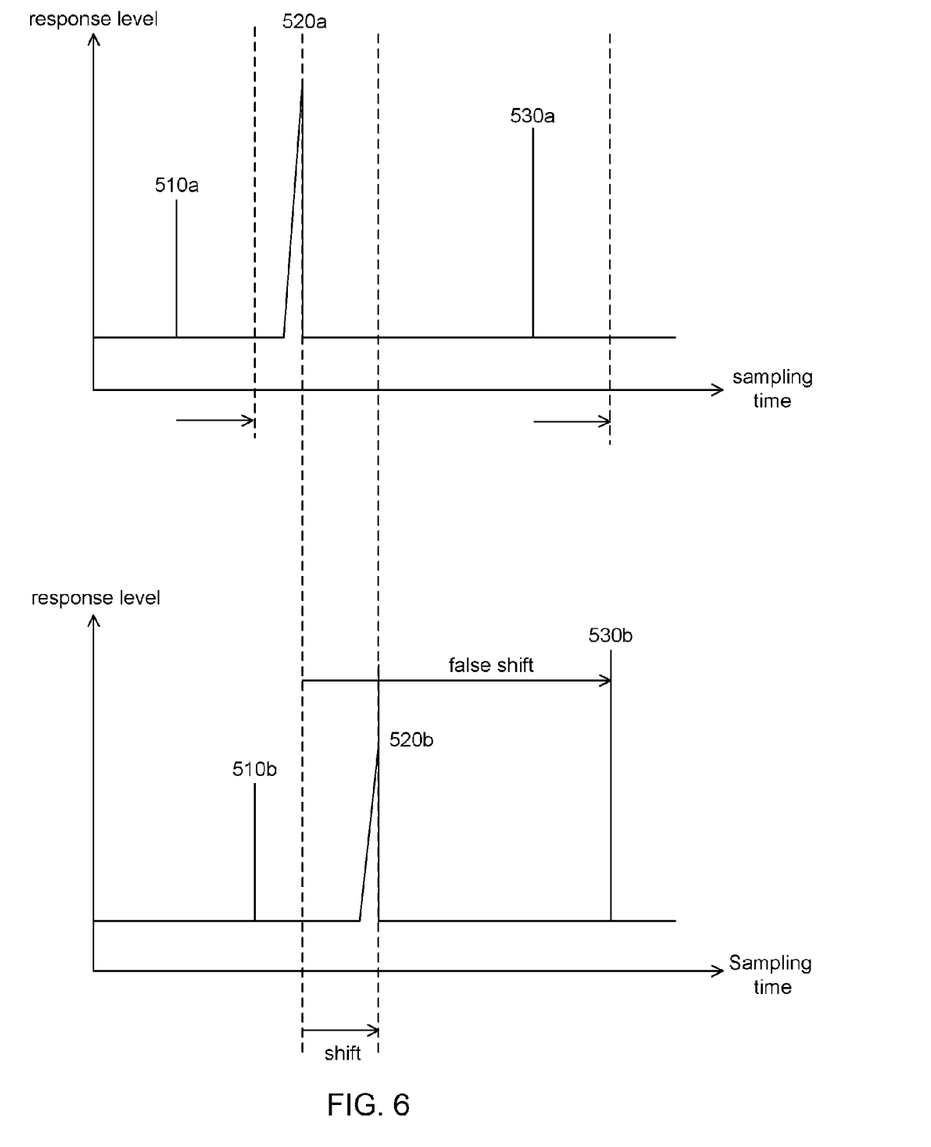
FIG. 6 is a schematic diagram of a timing shift in a peak of a channel pulse response according to another embodiment of the present invention.

FIG. 6 shows a schematic diagram of a timing shift in a peak of a channel impulse response according to another embodiment of the present invention. A difference of the embodiment shown in FIG. 5 is that, the primary peak corresponding to the first symbol is the second peak 520a, and the primary peak corresponding to the second symbol is the third peak 530b. When the shift amount between the primary peaks of the first symbol and the second symbol is selected as the basis, the basis calculated is a false shift amount between the third peak 530b and the second peak 520a. Although the energy distributions of signals along the three paths are changed to lead to changes in the response peaks, the three paths however remain the same. If the shift amount of the response peak between the two paths is mistakenly regarded as the shift amount, a false shift amount is obtained.

To prevent the above error, the calculation module 330 needs to determine the relationship of the above peaks, and more particularly the relative positions. When the relative positions of the three peaks are unchanged, according to the relationship of the relative positions of the peaks, the calculation module 330 determines that the peak 510a corresponds to the peak 510b, the peak 520a corresponds to the peak 520b, and the peak 530a corresponds to the peak 530b. Thus, in an embodiment shown in FIG. 6, the calculation module 330 calculates the shift amount between the primary peak 520a of the first symbol and the second peak 520b in the second symbol which corresponding to the peak 520a. That is, the shift amount is a relative shift amount between the peak 520b and the peak 520a.

In conclusion, in the embodiment in FIG. 5, the calculation module 330 calculates the correction signal according to the shift amount of the primary peak and the interval between two symbols. In the embodiment in FIG. 6, the calculation module 330 first identifies the relationship between the peaks, and then calculates the correction signal according to the shift amount of the corresponding peaks and the interval between two symbols.

One person skilled in the art can appreciate that, since the relationship between the peaks needs to be first identified in the embodiment in FIG. 6, the calculation amount of the embodiment in FIG. 6 is larger than that of the embodiment in FIG. 5. Therefore, in an embodiment of the present invention, when the shift amount calculated in the embodiment in FIG. 5 exceeds a previously calculated shift amount by a predetermined range, the method in the embodiment in FIG. 6 is utilized instead to increase the calculation amount and thus to prevent a false shift. In another embodiment of the present invention, when the calculation in the embodiment in FIG. 6 encounters the situation of FIG. 5, i.e., the primary peak is not changed, the embodiment in FIG. 5 capable of reducing the calculation amount can be utilized instead.

Figure 7:
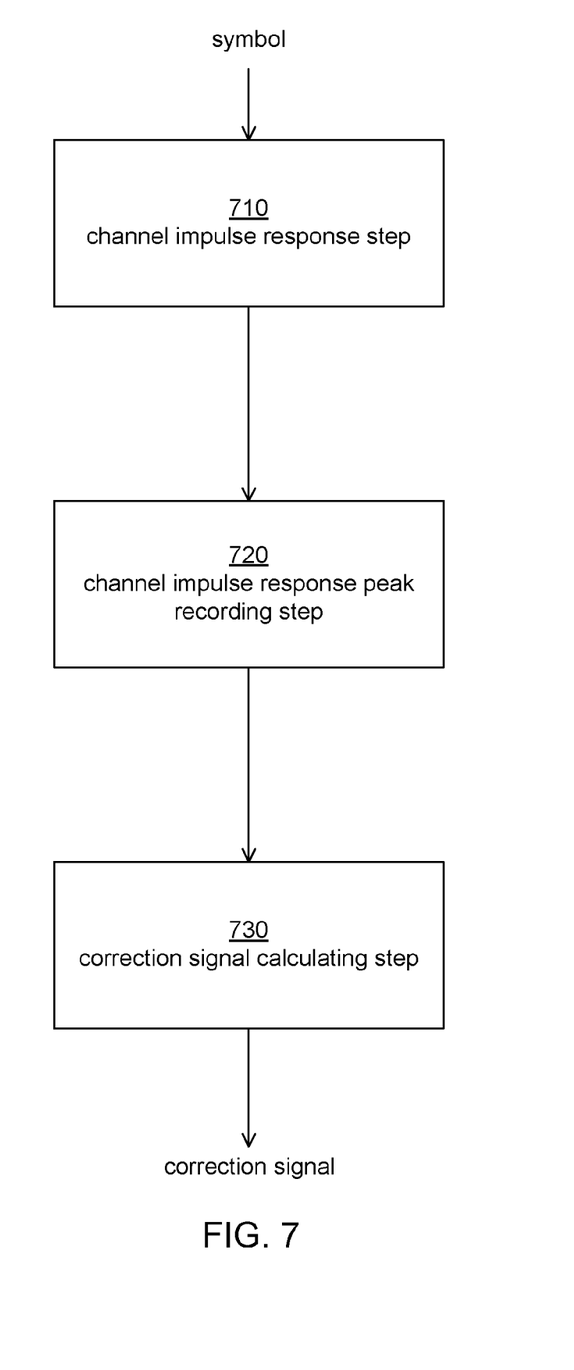
FIG. 7 is a flowchart of a correcting method according to an embodiment of the present invention.

FIG. 7 shows a schematic diagram of a process of a correcting method according to an embodiment of the present invention. The correcting method begins with a channel impulse response step 710 to perform a channel impulse response on multiple timing-recovered symbols. The process then proceeds to a channel impulse response recording step 720 to record one or multiple response peaks and/or or peak times of the channel impulse response of each symbol. In a correction signal calculating step 730, a correction signal is calculated according to the response peak(s) and/or peak time(s) and an interval between the symbols. The correction signal is then fed back to a timing recovery apparatus.

The symbols include a first symbol and a second symbol, which may be pilot signals. In one embodiment, the second symbol is a symbol that closely follows the first symbol. A correction amount represented by the correction signal is directly proportional to the peak time difference. In one embodiment, as shown in FIG. 4 and FIG. 5, the peak time is the time having the largest response in the channel impulse responses.

In another embodiment, as shown in FIG. 6, when multiple peaks higher than a threshold are present in the channel impulse response, before calculating the peak time difference, the peaks of first symbol and the second symbol are corresponded, and the peak time difference is calculated according to the time difference of the corresponding peaks. Wherein, the peak time difference may be the time difference between the highest peak of the first symbol and the corresponding peak of the second symbol. In another embodiment, the peak time difference may be the time difference between any peak of the first symbol and the corresponding peak of the second symbol.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A correcting method for timing recovery of a receiver, the receiver comprising a timing recovery module that outputs a first symbol and a second symbol, the correcting method comprising:
   calculating channel impulse responses for the first symbol and the second symbol to obtain a first set of peak times and a second set of peak times, respectively; and
   calculating a correction signal according to a relationship between the first set of peak times and the second set of peak times, and sending the correction signal to the timing recovery module.

2. The correcting method according to claim 1, wherein the step of calculating the relationship between the first set of peak times and the second set of peak times comprises:
   determining a first peak time and a second peak time from the first set of peak times and the second set of peak times according to the relationship between the first set of peak times and the second set of peak times, and calculating the correction signal according to a time difference between the first peak time and the second peak time.

3. The correcting method according to claim 2, wherein a correction amount corresponding to the correction signal is directly proportional to the time difference between the first peak time and the second peak time.

4. The correcting method according to claim 2, wherein the first peak time and the second peak time are times having largest responses in the first set of peak times and the second set of peak times, respectively.

5. The correcting method according to claim 2, wherein a relative position of the first peak time in the first set of peak times is same as a relative position of the second peak time in the second set of peak times.

6. The correcting method according to claim 1, wherein the first symbol and the second symbol are pilot signals.

7. The correcting method according to claim 1, wherein the first set of peak times and the second set of peak times are times corresponding to a plurality of peaks higher than a threshold when channel impulse responses are calculated for the first symbol and the second symbol.

* * * * *